United States Patent [19]

Varghese

[11] Patent Number: 5,589,020
[45] Date of Patent: Dec. 31, 1996

[54] APPARATUS FOR INSULATING CRYOGENIC DEVICES

[75] Inventor: Alexander P. Varghese, Bethlehem, Pa.

[73] Assignee: Air Products and Chemicals, Inc., Allentown, Pa.

[21] Appl. No.: 283,343

[22] Filed: Aug. 1, 1994

Related U.S. Application Data

[63] Continuation of Ser. No. 51,503, Apr. 21, 1993, abandoned.
[51] Int. Cl.⁶ .................................................. B31C 13/00
[52] U.S. Cl. ......................... 156/185; 156/186; 156/188; 156/190; 156/191
[58] Field of Search ................................... 156/185, 186, 156/188, 190, 191

[56] References Cited

U.S. PATENT DOCUMENTS 4,988,014  1/1991  Varghese et al. .................. 220/469

Primary Examiner—James J. Seidleck
Assistant Examiner—Michael A. Williamson
Attorney, Agent, or Firm—James C. Simmons

[57] ABSTRACT

A method and apparatus for facilitating insulation of cryogenic devices such as piping, dewars, tanks, superconducting assemblies and the like. A sleeve having a generally circular cross-section and a diameter slightly larger than the cryogenic device is fabricated from a material preferably having low thermal emissivity and covered with the required thickness of insulation so that what the insulated sleeve with the device installed inside is placed into a housing or jacket the required heat leak from the device when in use is achieved.

4 Claims, 2 Drawing Sheets

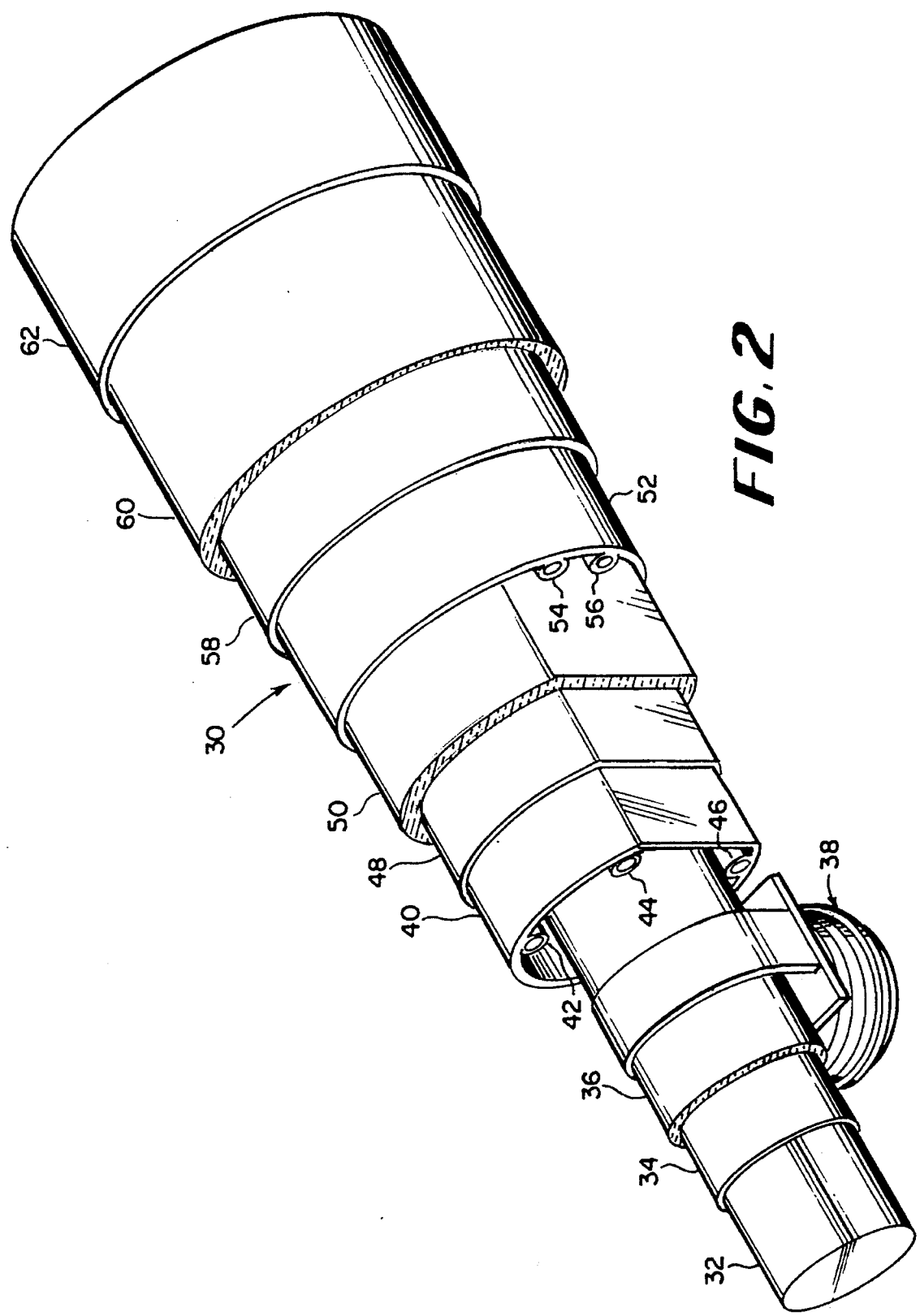

5,589,020

APPARATUS FOR INSULATING CRYOGENIC DEVICES

This application is a continuation of application Ser. No. 08/051,503 filed Apr. 21, 1993 now abandoned.

FIELD OF THE INVENTION

This invention pertains to insulating cryogenic devices such as storage dewars, tanks on containers, cryostats and piping to maintain cryogenic temperatures of the device.

BACKGROUND OF THE INVENTION

In fabricating devices for use at cryogenic temperatures such as for storing a cryogenic fluid (e.g. liquid helium or liquid hydrogen), it is conventional to use a dewar of the type shown in U.S. Pat. No. 4,988,014.

In fabricating a dewar of the type shown in the aforementioned patent it is conventional to take the inner vessel and cover it with a suitable insulation such as a multilayer composite of metal and plastic. The multilayer insulation is used on the internal supporting piping and all internal parts can be insulated to prevent heat infiltration and loss of cryogen stored in the inner vessel by evaporation.

The problem with using multilayer insulation in conjunction with a cold mass (e.g. inner vessel) or a shield which is sometimes disposed between the inner and outer vessels is that construction and insulation of the cold mass cannot be done simultaneously. Furthermore, the cold mass or shields cannot be removed from the insulation without damage to the insulation. Lastly, items that cannot be rotated and items with non-circular cross sections cannot be insulated with a better distribution of insulation than could be accomplished if the devices could be rotated about a longitudinal axis.

SUMMARY OF THE INVENTION

The new and effective method and apparatus for utilizing multilayer insulation and fabricating cryogenic devices utilizes a thin generally elongated sleeve having a generally circular cross section, the internal diameter of the sleeve being slightly larger than the article to be insulated. Utilizing the sleeve permits multilayer insulation to be dispersed around the outer surface of the sleeve by rotating the sleeve about a longitudinal axis of the sleeve. The method of the present invention permits more effective disposition of the insulation around the sleeve by having the ability to provide uniform wraps and layers of the conventional multilayer insulation. After the sleeve is insulated, the device to be protected can be installed inside of the sleeve. The sleeve with a device can then be installed inside an outer shell on jacket on can be installed in a second sleeve which has been preinsulated. According to the present invention the sleeves can become heat shields and any number can be disposed between the inner vessel on the cryostat and the outer vessel.

BRIEF DESCRIPTION OF THE DRAWING

FIG. 2 is a perspective view of a proposed embodiment of the present invention.

DESCRIPTION OF THE INVENTION

Figure 1:
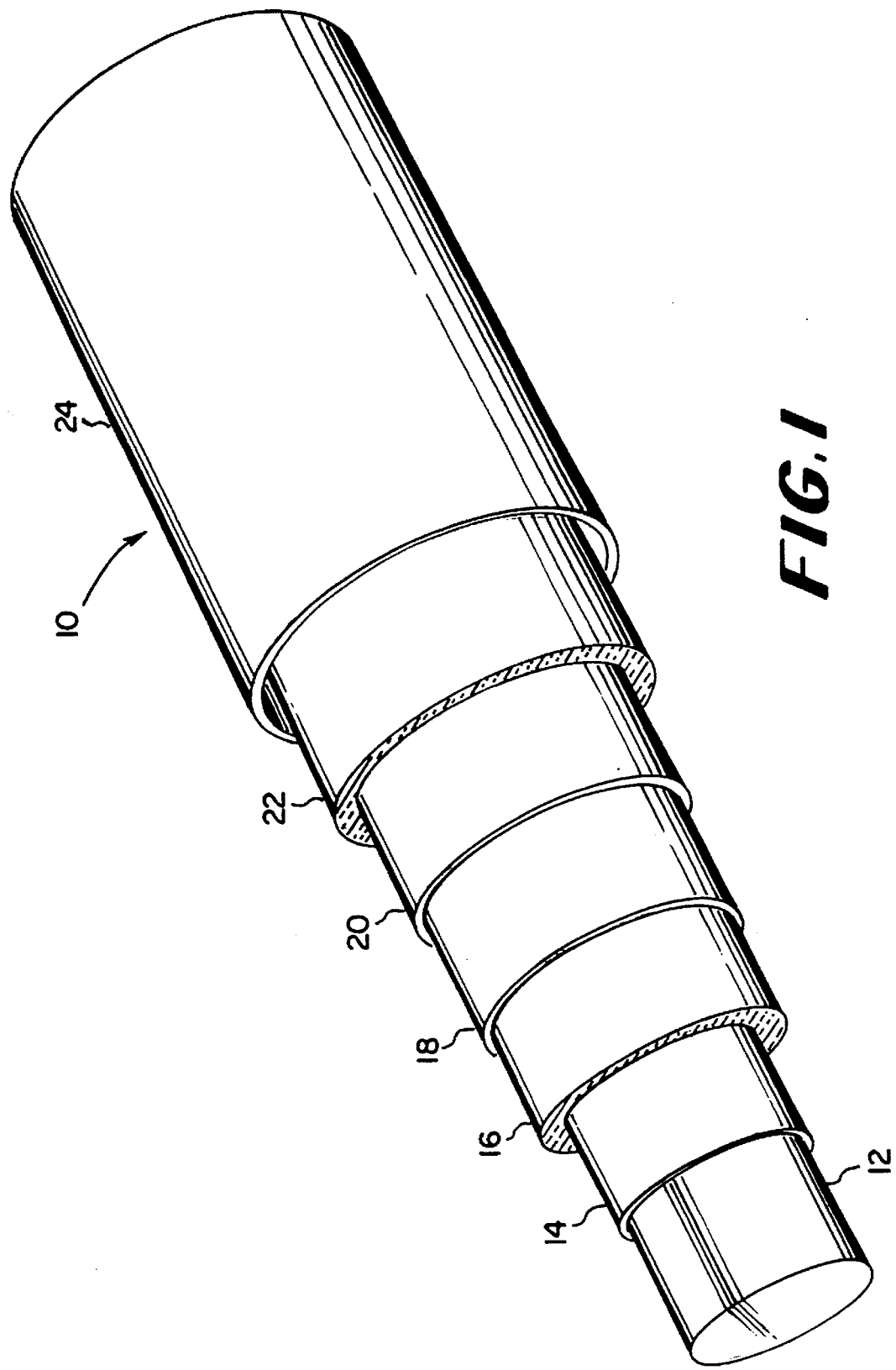
FIG. 1 is a perspective schematic representation of the present invention.

Referring to FIG. 1 there is shown an assembly 10 according to the present invention. Assembly 10 includes an item to be insulated on protected from heat infiltration 12. Item 12 can be a pipe, the inner vessel of a jacketed dewar such as shown in U.S. Pat. No. 4,988,014, a wire on the like. Item 12 is disposed inside of a first sleeve 14 which can be fabricated from a flexible or a rigid material. The material of construction of sleeve 14 can be metallic on non-metallic as will be discussed below. Sleeve 14 is fabricated in the shape of an elongated cylinder having a generally circular cross section with an inside diameter that is slightly larger than the cold mass on device 12 to be protected.

Disposed on top of sleeve 14 is a multilayer insulation 16 as is well known in the art. Multilayer insulation for use in cryogenic applications is most generally a composite of a metal and a plastic wrapped in alternate layers. Insulation 16 can be readily wrapped on sleeve 14 prior to installation of the cold mass 12 by mounting the sleeve 14 on a lathe on other device and turning the sleeve 14 as the insulation layer 16 is disposed over the sleeve 14. The nature and depth of the insulation is determined by the temperature at which the cold mass is to be maintained. At liquid helium temperature (e.g., 4° K.) one type of insulation may be used whereas if the cold mass 12 is a pipe transmitting a different cryogenic fluid (e.g. liquid nitrogen at 77° K.) the multilayer insulation can be of a different type.

Mounted on top of the multilayer insulation 16 can be a heat shield 18. Heat shield 18 can be fabricated from a conductive material and used to intercept radiation leaking toward the cold mass 12 from the ambient atmosphere. Disposed on top of heat shield 18 can be a second sleeve 20 over which is placed another layer of multilayer insulation 22. Sleeve 20 can be pre-wrapped with multilayer insulation prior to being slipped over shield 18. The entire assembly (cold mass 12, sleeve 14 insulated layer 16, shield 18, sleeve 20 and insulating layer 22) can then be disposed inside of a jacket or outer shell 24. The jacket or outer shell is generally sealed and the interior thereof can be evacuated as is well known in the art.

in accord with the present invention, sleeves 14 and 20 can be fabricated from a flexible metallic or non-metallic material slightly larger in diameter than the item to be insulated. If the sleeves are flexible then normally they would be installed onto a core or fabricated on a core and the core would be left in place until the sleeve is insulated. In certain applications a rigid sleeve may be used in which case the core will be unnecessary. Multilayer insulation is wrapped onto the sleeves 14, 20 by rotating either the core op the rigid sleeve as the case may be. Once the required number of wraps of multilayer insulation are installed, the outer most layer of the insulation can be taped. If a flexible or rigid sleeve is used on a core, the core is then removed and the sleeve with the insulation on the outer surface can then be slid over the item to be insulated, e.g., cold mass 12 or shield 18 as shown in FIG. 1. When a rigid sleeve without a core is used, it can be slid directly over the item to be insulated. If only a single sleeve is used, then the vacuum jacket and supports can be installed over the sleeve and insulation before the sub-assembly is installed over the ltem to be insulated. Thus, the whole sub-assembly comprising the insulation, supports, shield (if any) and vacuum jacket can be pre-assembled over the sleeve and kept ready to receive the item to be insulated, thus enhancing fabrication of insulation systems for cryogenic devices.

Sleeves 14 and 20 are preferably made of materials with low thermal emissivities. Materials of construction for the sleeve can be metal or non-metallic or composites if the two. Metals used to fabricate the sleeves can be aluminum, copper, silver, gold or stainless steel. Examples of non-metallic materials useful for fabricating the sleeves are polyesters, nylons, fiber-reinforced epoxies, polyamides and polytetrafluoroethylene. The sleeve can be coated or wrapped with a layer of metal or metal foil, such as aluminum, copper, silver, gold and stainless steel. Non-metallic materials coated with a metal can also be used to coat the sleeve. As set out above, the inside circumference of the sleeve must be sufficiently large enough to accommodate the outside circumference of the item to be insulated with ease. Insulation materials can be conserved if the sleeve circumference is kept to the minimum required.

The device and method of the present invention can be used in manufacturing cryogenic piping, cryogenic dewars, cryogenic tanks, cryogenic equipment with non-circular cross sections, superconducting magnets and other superconducting devices, and other miscellaneous cryogenic equipment, the invention not limited to devices herein enumerated.

After sub-assembly of a sleeve with a layer of insulation, a second sleeve can be placed over the layer of insulation to protect the sub-assembly during further handling or, as shown in connection with FIG. 1 can be used to provide even more effective insulation.

Referring to FIG. 2 the present invention is proposed fop use in an assembly shown generally as 30 which comprises a cold mass 32 which may be a superconducting magnet device. The cold mass 32 will be disposed inside of a sleeve 34 fabricated from a material of low thermal emissivity. Sleeve 34 is covered with a layer of a multilayer insulation 36. The sub-assembly of the sleeve 34 covered by the insulation 36 can be disposed in a slide cradle assembly 38 which facilitates installation of the device inside of an outer jacket. Disposed around the sub-assembly of the sleeve and multilayer insulation in the cradle assembly 38 is a 20° Kelvin thermal radiation shield 40 which is cooled by cold helium gas circulated through a plurality of conduits 42, 44 and 46 disposed in thermal conductive relationship to the shield 40. The shield 40 can be disposed inside of a second sleeve 48 which is covered by another layer of multilayer-insulation 50. This assembly can in turn be placed inside of a 80° Kelven thermal shield 52 which is cooled by a plurality of liquid nitrogen conduits or tubes 54, and 56 which are in thermal contact with the shield 52. This assembly can in turn be placed inside of a third sleeve 58 which in turn is covered by another layer of multilayer-insulation 60 and the entire assembly can be disposed inside of an outer jacket 62.

The thermal shields 40 and 52 can be fabricated with the conduits cast in place or the conduits welded thereto by techniques which ape well known in the cryogenic refrigeration art. The device of FIG. 2 can be a complete sub-assembly which 1s fabricated prior to inserting the cold mass 32 inside of sleeve 34. If the entire assembly is fabricated prior to insertion of the cold mass, then once the cold mass is inserted the outer jacket 62 can be sealed and evacuated.

According to the present invention, the method and the apparatus provides a convenient way to overcome the practical problems associated with wrapped multilayer insulation in the prior art. Thus, for example, direct spiral wrapping of items of non-circular cross section which generally result in non-uniform distribution of insulation which can contribute to inferior thermal performance of the total assembly can be avoided by using the method and apparatus of the present invention.

Preassembly of the insulation, shielding (if any), supports and vacuum jackets starting with the sleeve instead of the Item to be insulated will facilitate simultaneous manufacturing of the item to be insulated and the cryostat part; thus, substantially reducing manufacturing time.

The removal of the cryostat part from the cold mass (item to be insulated) is much easier when the insulation was installed on the sleeve. This also eliminates possible damage to the insulation while removing the cold mass for repair or other purposes. It is also possible to salvage cryostats or cold masses from defective assemblies when using the method and apparatus of the present invention.

The difficult and time consuming task of spiral wrapping insulation onto cold masses which cannot be rotated, are not circular in cross section or cannot be rotated about a geometric center line, are rendered easier by the process of installing insulation on sleeves and sliding the sleeve onto the cold masses. Better thermal performance will also result clue to the better distribution of insulation on the cold mass.

The use of the sleeve and the method of the present invention is distinguished from present methods used to spiral wrap insulation on difficult to rotate and non-circular masses. The use of sleeves will also speed up the manufacturing process by allowing simultaneous construction of the cryostat and cold mass. At present, the insulation, shields, supports and vacuum jacket are assembled in steps onto the completed cold mass.

The sleeves allow the convenient and damage free transfer of spiral wound insulation and the prefabrication of the cryostat part which is difficult if not impossible using methods according to the art as it is known at the time of this invention,

Having thus described my invention was desired to be secured by letters of patent of the U.S. is set forth in the appended claims.

I claim:

1. A method of insulating a cryogenic device without directly applying insulation to the device comprising the steps of:

providing a sleeve having a generally circular cross-section and a longitudinal axis fabricated from a material having low thermal emissivities, the sleeve having a diameter larger than the device to be insulated;

positioning said sleeve for rotation about said longitudinal axis;

rotating said sleeve and wrapping said sleeve with the desired thickness of thermal insulating material; and installing said device inside said sleeve after insulation of said sleeve is completed.

2. A method according to claim 1 including the steps of installing a device selected from the group consisting of piping, dewars, tanks and superconducting devices inside said sleeve.

3. A method according to claim 1 including the steps of wrapping said sleeve with a multilayer insulation.

4. A method according to claim 1 including the steps of fabricating said sleeve from a metallic or non-metallic material of a circumference more than the device to be insulated and installing the assembled insulated sleeve and device inside a vacuum jacketed vessel.

* * * * *